(12) United States Patent
Adams et al.

(10) Patent No.: US 8,247,046 B2
(45) Date of Patent: Aug. 21, 2012

(54) MULTI-LAYER TUBE OF IMPROVED PHYSICAL PROPERTIES

(75) Inventors: Kevin John Adams, Alfords Point (AU); Mariano Villaescusa, Ingleburn (AU)

(73) Assignee: Ezytube Pty Limited, Ingleburn (AU)

( * ) Notice: Subject to any disclaimer, the term of this patent is extended or adjusted under 35 U.S.C. 154(b) by 652 days.

(21) Appl. No.: 10/566,319

(22) PCT Filed: Jul. 30, 2004

(86) PCT No.: PCT/AU2004/001017
§ 371 (c)(1),
(2), (4) Date: May 10, 2007

(87) PCT Pub. No.: WO2005/011972
PCT Pub. Date: Feb. 10, 2005

(65) Prior Publication Data
US 2008/0045393 A1    Feb. 21, 2008

(30) Foreign Application Priority Data

Jul. 30, 2003 (AU) ................... 2003903948

(51) Int. Cl.
*B32B 1/08* (2006.01)
*B32B 27/10* (2006.01)
*E04G 13/02* (2006.01)

(52) U.S. Cl. ...... 428/34.2; 249/51; 249/48; 249/DIG. 2; 493/299

(58) Field of Classification Search ............... 428/34.2; 248/51, 48, DIG. 2; 493/299
See application file for complete search history.

(56) References Cited

U.S. PATENT DOCUMENTS

| | | | | |
|---|---|---|---|---|
| 4,150 A | * | 8/1845 | Day ..................... | 138/126 |
| 2,677,165 A | * | 5/1954 | Copenhaver et al. ...... | 264/31 |
| 2,914,833 A | * | 12/1959 | Hart, Jr. et al. .......... | 138/154 |
| 3,020,615 A | * | 2/1962 | Peters ................... | 138/129 |
| 3,644,611 A | * | 2/1972 | Wiles ................... | 264/334 |
| 4,567,070 A | * | 1/1986 | Karass .................. | 229/117.13 |
| 4,595,168 A | | 6/1986 | Goodwin | |
| 4,629,529 A | * | 12/1986 | Kadunce ............... | 156/428 |
| 4,640,853 A | * | 2/1987 | Schmeal et al. ......... | 428/34.2 |
| 4,711,801 A | * | 12/1987 | Kadunce ............... | 428/192 |
| 4,957,270 A | * | 9/1990 | Rummage et al. ........ | 249/48 |
| 5,043,033 A | * | 8/1991 | Fyfe ................... | 156/71 |
| 5,328,142 A | * | 7/1994 | Weekers ............... | 249/48 |
| 5,376,316 A | | 12/1994 | Weekers | |
| 5,505,395 A | * | 4/1996 | Qiu et al. ............. | 242/118.32 |
| 5,586,838 A | * | 12/1996 | Walsh ................. | 405/216 |
| 5,706,865 A | * | 1/1998 | Douchet ............... | 138/125 |
| 6,066,373 A | * | 5/2000 | Floyd et al. ........... | 428/34.3 |
| 6,295,782 B1 | * | 10/2001 | Fyfe ................... | 52/834 |
| 6,455,115 B1 | * | 9/2002 | DeMeyer .............. | 428/36.2 |
| 6,460,575 B1 | | 10/2002 | De Meyer et al. | |
| 6,872,030 B2 | * | 3/2005 | Ashton et al. ......... | 405/211 |
| 6,878,323 B2 | * | 4/2005 | Fyfe .................. | 264/135 |
| 2001/0023714 A1 | | 9/2001 | Niki et al. | |
| 2004/0052986 A1 | * | 3/2004 | Bank .................. | 428/34.2 |

FOREIGN PATENT DOCUMENTS

EP    1 001 204 B1    1/2003
WO    01/94826 A2    12/2001

OTHER PUBLICATIONS

Cordeiro, C. F. 2000. Vinyl Acetate Polymers. Kirk-Othmer Encyclopedia of Chemical Technology published online Dec. 4, 2000.*
Derwent Accession No. 2003-682351/65, FR 2835584 A (Allibert Equip. SA), Aug. 8, 2003, Abstract.
Derwent Accession No. 96-438079/44, JP 8216137 A (Hokkai Shikan KK) Aug. 27, 1996, Abstract.

* cited by examiner

*Primary Examiner* — Michele L Jacobson
(74) *Attorney, Agent, or Firm* — Woodcock Washburn LLP

(57) ABSTRACT

A tube having walls of multi-layer construction, wherein said multi-layer construction includes one or more sub-layers, each said sub-layer consisting of a woven polymer mesh disposed in between one or more outer layers of material selected from the group consisting of paper, poly-propylene and polyethylene, wherein said tube is formed by affixing said sub-layers to each other while said sub-layers are wound around a mandrel.

22 Claims, No Drawings

MULTI-LAYER TUBE OF IMPROVED PHYSICAL PROPERTIES

CROSS-REFERENCE TO RELATED APPLICATIONS

This application is the national stage of International PCT Application No. PCT/AU2004/001017, filed Jul. 30, 2004, which claims priority to Australian Application No. 2003903948, filed Jul. 30, 2003, the disclosures of which are hereby incorporated by reference as if set forth in their entirety herein.

FIELD OF THE INVENTION

The invention relates to the field of manufacture of multi-layer tubing that are manufactured via spiral winding processes commonly used for paper tubes and cores, known in the art as cardboard or fibreboard tubes. In particular, the invention relates to an improved construction of a tubular product having improved physical properties, including increased tensile strength and impact resistance, among others.

BACKGROUND OF THE INVENTION

In the field of manufacture of tubular products formed from multi-layer paper construction, the physical strength characteristics of said products based on a particular paper material, which may relate to tensile strength, crush resistance, tear or puncture resistance or other parameters, is determined to a primary extent by the number of layers of paper incorporated in the tube wall, and the properties of the adhesives used to bind the paper layers together. Typically, greater strength is achieved primarily by incorporating more layers of paper in the tube wall. Similarly, greater resistance to loss of strength in unfavourable environments, such as humid or damp environments, is achieved by using stronger or moisture resistant adhesives, such as sodium silicate or PVA adhesives.

Paper tubes and cores are traditionally formed by gluing multiple layers of paper (typically Kraft paper or similar fibrous paper) to each other whilst winding each layer around a steel mandrel of a given diameter. The process usually involves supplying the various layers of these tubes on individual rolls or other dispensers, concurrently drawing the materials from the dispensers in a predetermined array; applying adhesive concurrently to different strands not in contact with one another; and then winding the array into a tube structure around a mandrel. This technique is known as "spiral winding" in the art and will be understood as such in the following description and claims where this term is used. Equipment for performing this process is supplied, for example, by Pack Industrie, of rue Gutenberg-B.P. 109-68170 RIXHEIM (Alsace)-FRANCE.

Typically the number of layers of paper to be used depends upon the physical requirements required for the tube, eg small diameter paper tube for toilet paper cores would require a small number of thin layers of paper using cheaper dextrin adhesives; a core for rolls of paper weighing up to 2 tonnes may require Brown Chip Board or Liner Board with silicate or PVA glues; or a tube for casting concrete into would require greater wall thickness with glues of greater water resistance, therefore requiring a greater number of layers of paper.

However, these measures typically make the tubes heavier, more difficult to transport due to mass and/or lack of flexibility, more difficult to cut open where necessary, and more difficult and expensive to manufacture. In addition, silicate based adhesives are more expensive, and present various safety issues during manufacture. For example, some silicate-based adhesives are likely to set very hard, and residues can tend to present a cut hazard. In addition, some water resistant adhesives take a longer time to cure, sometimes requiring assistance by curing in ovens etc, which may increase the unit cost and capital cost of manufacturing lines.

Accordingly, it is necessary to find ways of improving various of the strength parameters of paper-based tubing which overcomes some or all of these issues with respect to various of the applications to which these tubes are put.

For example, in the building and construction industry, the use of multiple layer paper based tubes and formwork in the casting of vertical concrete piles has become common practice in setting the foundations for buildings, especially larger multiple-storey constructions.

The typical construction used in the prior art for single-use casting tubes is to create a rigid tube from multiple layers of kraft or other fibrous paper. However, as discussed above, one issue encountered with kraft or other fibrous paper construction is that it tends to lose tensile strength when wetted, causing bulging or failure. Also, in humid conditions, the dimensions of the tube can tend to alter, which makes control of the dimensions of the concrete pile difficult.

An approach taken in the prior art to the construction of such tubes is exemplified in U.S. Pat. No. 5,376,316 (Weekers), wherein there is described a tube being made essentially from multiple layers of kraft paper. This particular casting tube also includes a layer of plastic material within the layers of kraft paper for the express purpose of improving the waterproofing properties of the tube. However, this document does not suggest how the overall strength of the tube may be improved. For example, a drawback with this construction is that while the plastic layer may provide some barrier to wetting of the kraft paper layers, it cannot completely prevent weakening of these layers where water might enter from both sides, or especially if water enters through the ends of the tube.

In any case, there are concrete forming applications where a semi-rigid or rigid tube is necessary. The prior art does not teach any method of strengthening and/or waterproofing such tubes. Presumably, the person faced with this problem must resort to the above-discussed methods involving further paper layers and/or expensive adhesives.

Equally, where such paper-based tubes are to be used as packaging material for hard, sharp and/or heavy materials, such as metal components, a major issue is that these items tend to place a great deal of localised impact strain on the tube wall as they shift during transport. Again, the construction disclosed in Weekers would not be sufficiently rigid to reliably be used for this kind of packaging measure, but the only other solution available in the prior art would appear to relate to the well-known route of applying more and more layers of paper to the tube.

Similarly, when attempting to create a tube having superior crush resistance, for example for use as a heavy duty core for rolled products such as newsprint, the prior art teaches only the familiar solution of applying more and more layers of paper to the tube and different types of paper.

Therefore, it is an object of the present invention to provide a multi-layer tubing material of improved physical properties, which does not require excessive paper layering or the use of expensive or hazardous adhesives, and which may be manufactured using conventional paper tube forming equipment.

SUMMARY OF THE INVENTION

According to one aspect of the invention, there is provided a tube having walls of multi-layer construction, wherein said multi-layer construction includes one or more sub-layers, each said sub-layer consisting of a woven polymer mesh disposed in between one or more outer layers of material selected from the group consisting of paper or polymer material, wherein said tube is formed by affixing said sub-layers to each other whilst said sub-layers are formed into a tube using spiral winding equipment for the manufacture of paper tubes.

Preferably, the paper is kraft paper, the polymer material is high density poly-ethylene (HDPE) or poly-propylene (PP), and the paper layers are bonded to the mesh via an intermediate layer of poly-ethylene (PE). The bonding between the outer paper layers of successive sub-layers may be performed by water-based adhesives of the kind well known in the art.

The tensile strength of the mesh material provides an effective way to increase the overall tensile and impact strength of the tube, in a manner which is not susceptible of weakening due, for example, to moisture ingress. In addition, the superior dimensional stability of the mesh provides the same advantage to the tube, even in conditions of high relative humidity, thereby obviating the need to incorporate undesirable solvent-based adhesives.

This increased overall tensile strength provided by the mesh allows superior performance of the tube, without needing to resort to excessive paper layering, meaning that a stronger, tougher tube may be manufactured without greatly increasing the tube mass. Alternatively, a tube may be manufactured to the same strength specifications as known in the prior art, but having significantly thinner walls.

A further advantage of the invention is that as the paper affixed to the outside of the sub-layers is mainly present to provide a suitable adhesive surface for the bonding of successive sub-layers, the thickness of these paper layers may be reduced compared with the prior art, for example to about 40 g/m$^2$, providing further opportunities to reduce the necessary tube wall thickness for the tube strength desired.

A further advantage of the invention is that as the bonding of successive sub-layers is to be achieved via paper-paper bonding using conventional water-based adhesives, the tube according to the invention may be manufactured on conventional spiral-wound paper tube manufacturing equipment.

Preferably, the grammage of the HDPE or the PP mesh is between 40 g/m$^2$ and 80 g/m$^2$ with the overall grammage of the composite structure being approx 120 g/m$^2$ and 180 g/m$^2$. Preferably the tensile strength of said mesh is greater than about 6.5 kN/m. The mesh may take the form of a simple cross-weave or may be provided in any other suitable format. Preferably, said mesh is provided in the form of a scrim cloth having between 6 and 15 strands per inch in any direction.

When applied to the casting of concrete, the inventive construction of the form tube not only assists in directly arresting the ingress of water into the tube structure, but as its tensile strength is not affected by water itself, it prevents the tensile strength of the overall tube being compromised by water ingress.

The invention is applicable to both rigid and flexible 'lay-flat' tubing.

A preferred structure for the tubing, when used as a rigid concrete form material, is one where a sufficient number of sub-layers are provided to ensure the thickness of the tube wall is between about 2.5 mm and about 5 mm, in order to allow the tubing material sufficient strength to be self-supporting when stood upright, while retaining an ability to be removed via relatively simple means such as cutting with a hand-held knife, and in order to provide a semi-rigid or rigid structure of superior tensile strength and moisture resistance.

An alternative structure, which provides a concrete forming tube having improved strength, but with sufficient flexibility to be stored and transported in a 'flattened' state, includes one or two layers of the above described 'sandwich' structure. The woven structure of the polymer mesh assists in providing a greater degree of tensile strength than might be provided by a simple sheet of plastic material, as per the prior art. In addition, the preferred mesh is exceptionally good at resisting stretching or bulging when the tube is filled with concrete. This allows the provision of a lay-flat tubing which has the requisite strength for typical concrete casting operations. The total thickness of this embodiment of the inventive tubing material is likely to be no greater than about 1.5 mm.

In a further alternative embodiment, in order to provide a suitable surface for the inner casting surface of the tube, one or more additional layers of polymer sheeting, for example polyethylene, may be bonded to the outermost sub-layers.

In relation to the use of the inventive tube structure in the material packaging field, a tube suitable for use as a container for, for example, metal components is provided via a tube wall structure having four or five of said 'sandwich' layers, the walls of the tube having a thickness of at least about 2.5 mm, in order to allow the tubing material sufficient tensile strength to resist tearing or puncturing when hard or sharp components come into the kind of violent contact with the inner surface of the tube as may be expected during transport.

It is also anticipated that a tube of improved crush resistance may be provided where the inventive tube wall structure is applied, as the improved tensile resistance of the wall is likely to assist in preventing deformation of a thicker version of such tubes. The improved tensile strength achieved throughout the tube wall is likely to assist in preventing differential buckling of the tube, of the kind where one side of the wall, for example the outer side, is placed under compression and the immediately adjacent and corresponding section of the wall, for example the inner side, is placed under tension. The portion of the wall placed under tension is accordingly less likely to yield to the crush force.

Preferably, when used as a core of this kind, a tube wall structure is provided having about 10 to 50 sub-layers, and an overall thickness of about 20 mm.

Now will be described, by way of specific, non-limiting examples, a preferred embodiment of the invention.

DETAILED DESCRIPTION OF A PREFERRED EMBODIMENT

In the embodiments discussed below, each will be understood to be formed by the technique known in the art as 'spiral winding'.

In one preferred embodiment, the invention provides a rigid concrete form tube constructed from multiple sub-layers of material, wherein each said sublayer consists of a woven HDPE mesh disposed in between one or more layers of material selected from the group consisting of kraft paper, polypropylene, and polyethylene. Similar results may be obtained with PP mesh. The kraft paper may be bonded to the mesh in a conventional manner according to the art, but it is particularly preferred that the paper is bonded to the mesh via an intermediate layer of poly-ethylene (PE).

An example of the preferred kind of mesh material is that supplied by Insulation Solutions, of 127 Dandenong-Frankston Road, Dandenong, Victoria 3175, Australia, under the name of "Metal Wrapping", item no. 1625.

This material has properties as outlined in Table 1.

TABLE 1

| Property | Specification |
|---|---|
| Structure | Coated HDPE weave bonded to one layer of Kraft paper. |
| Tensile strength | MD 12.7 kN/m |
| | CD 6.9 kN/m |
| Overall Grammage | 134 g/m$^2$ |
| Puncture & Tear (PPT) | MD 24 N |
| | CD 40 N |
| 'Beach' Puncture | 3.5 J |
| Water Absorption (Cobb @ 15 min.) | 46 g/m$^2$ |

Typically, the HDPE material is supplied in the form of a scrim cloth having between 8 and 10 strands per inch in any direction. This material is particularly suited to this application due to its very high tensile strength, and in particular to its very high resistance to any level of stretching. The HDPE is then laminated with 40 gsm kraft paper via low-density polyethylene (LDPE) via conventional methods known in the art.

The general type of concrete form tubes to which the invention may be applied are described in detail in U.S. Pat. No. 5,376,316 discussed above, and the following description is made with reference to the general kind of structures described therein.

An ideal structure for a rigid casting tube incorporating this material would consist of between four and six of the above described sub-layers, bonded together by a conventional paper-paper adhesive, such as PVA. The material may be constructed using conventional spiral winding apparatus well known in the art, which involves gluing or otherwise affixing multiple layers of paper (typically, Kraft paper or similar fibrous paper) to each other whilst winding each layer around a steel mandrel of a given diameter.

Further layers of polyethylene may be affixed to the outer surfaces of the material to provide a desired surface texture for the casting. In particular, it is preferred that there be sufficient layers of polyethylene bonded to the inside surface of the tube to ensure a smooth surface of the casting. The overall thickness of the tubing material should be between 2.5 mm and 5 mm in order to provide sufficient rigidity to stand up without the assistance of a rigid superstructure.

Where different surface finishes are required, the person skilled in the art will be aware of other alternative materials which are available to achieve various finishes or surface properties.

It will be appreciated by those skilled in the art that the invention is not only applicable to tubing constructed predominantly from kraft paper, and that this is merely one of the more common materials used in this industry and whose properties are likely to be enhanced by the invention.

For example, it would be possible to construct a casting tube by incorporating the HDPE mesh within multiple layers of another polymer material such as polyethylene. In such a case, it would be preferable to bond the layers together by direct heat treatment or by using a hot-melt glue.

An ideal structure for a flexible casting tube incorporating this material would consist of one or two of the above-described sub-layers, with optionally further layers of a single sided paper/mesh composite affixed to the outer surface of the tube material to provide a desired surface texture, but having an overall thickness of less than 4 mm in order to provide sufficient flexibility to lay flat when not in use.

It will further be apparent to those skilled in the art that the invention provides an improved construction of multi-layer tubes for a variety of different applications, notwithstanding the preferred embodiments addressed above are addressed to concrete forming. It is apparent that the improved tensile strength of the tubing material provided by the invention will afford improved performance in many other applications where such properties are desirable.

For example, a tube of similar construction to that described above for the rigid form-work tube might equally be applied as a packaging material for metal components. A tube wall structure having four or five of said inventive sub-layers, the walls of the tube having a thickness of between about 3 mm and about 4 mm, is anticipated to allow the tubing material sufficient tensile strength to resist tearing or puncturing when hard or sharp components come into the kind of violent contact with the inner surface of the tube as may be expected during transport.

It is also anticipated that a tube of improved crush resistance may be provided where the inventive tube wall structure is applied, as the improved tensile resistance of the wall is likely to assist in preventing deformation of a thicker version of such tubes. As described above, the improved tensile strength achieved throughout the tube wall is likely to assist in preventing differential buckling of the tube, of the kind where one side of the wall, for example the outer side, is placed under compression and the immediately adjacent and corresponding section of the wall, for example the inner side, is placed under tension. The portion of the wall placed under tension is accordingly less likely to yield to the crush force.

Preferably, when used as a core of this kind, a tube wall structure is provided having 10 to 15 sub-layers, and an overall thickness of about 20 mm.

The invention claimed is:

1. A tube having a peripheral wall of multi-layer construction, the multi-layer construction including one or more sub-layers, wherein each sub-layer is a laminate that comprises a layer consisting of a woven polymer mesh to which is bonded on a first side thereof a paper layer by means of an intermediate layer of polyethylene material, the sub-layers being bonded to each other through an adhesive material to provide a spirally-wound, multi-layer peripheral wall structure.

2. The tube of claim 1, wherein said mesh is provided in the form of a scrim cloth having between 6 and 15 strands per inch.

3. The tube of claim 2, wherein the grammage of the sub-layer is between about 120 g/m2 and about 180 g/m2 and has a tensile strength of greater than about 6.5 kN/m.

4. The tube of claim 1, wherein the paper is kraft paper that has a minimum grammage of about 40 g/m2.

5. The tube of claim 1, wherein the tube is a rigid concrete column form tube of multi-layer construction and wherein the thickness of the peripheral wall is at least 2.5 mm.

6. The tube of claim 5, wherein the thickness of the tube wall is no greater than about 5 mm.

7. The tube of claim 1, wherein the tube is a flexible concrete column form tube of multi layer construction, and wherein the thickness of the peripheral wall is no greater than about 1.5 mm.

8. The tube of claim 1, wherein the tube is a roll core tube having a peripheral wall thickness of at least 2.5 mm.

9. The tube of claim 2, wherein the tube is formed by bonding the sub-layers to each other by an adhesive material whilst the sub-layers are formed into the tube using spiral winding equipment.

10. A tube having a peripheral wall comprising multiple layers between an outer and an inner face of the tube, at least one of the layers comprising a laminated sub-layer spirally wound into the tube, the laminated sub-layer comprising a layer consisting of a woven polymer mesh to which is bonded on a first side thereof a paper layer by means of an intermediate layer of polyethylene material.

11. The tube of claim 10, wherein the tube is formed by affixing the laminated sub-layer on to another one of multiple layers using spiral winding equipment.

12. The tube of claim 10, wherein the mesh is provided in the form of a scrim cloth having between 6 and 15 strands per inch.

13. The tube of claim 10, wherein the grammage of the laminated sub-layer is between about 120 g/m2 and about 180 g/m2 and has a tensile strength of greater than about 6.5 kN/m.

14. The tube of claim 1 or 10, wherein each laminated sub-layer consists of a woven polymer mesh sandwiched between and bonded to respective outer paper layers by means of a respective intermediate layer of polyethylene material.

15. The tube of claim 1 or 10, wherein the multi-layer peripheral wall further includes at least one polyethylene layer.

16. The tube of claim 15, wherein at least one of the polyethylene layers is present at and provides an inner face of the peripheral wall of the tube.

17. A tube having a peripheral wall of multi-layer construction, the multi-layer construction including a plurality of laminated sub-layers that comprise a layer consisting of a woven polymer mesh to which is bonded on a first side thereof a first outer layer of a material selected from paper, polyethylene or polypropylene by means of an intermediate layer of polyethylene material, the sub-layers being bonded to each other through an adhesive material to provide a spirally-wound, multi-layer peripheral wall structure.

18. The tube of claim 17, wherein at least some of the laminated sub-layers consist of a woven polymer mesh sandwiched between and bonded to respective outer layers of a material selected from paper, polyethylene by means of a respective intermediate layer of polyethylene or polypropylene material.

19. The tube of claim 18, wherein the outer layers of the laminated sub-layers are made of kraft paper, and wherein the tube is formed by bonding the sub-layers to each other by an adhesive material, whilst the sub-layers are formed into the tube using spiral winding equipment.

20. The tube of claim 19, wherein at least one polyethylene layer is present and provides an inner face of the peripheral wall of the tube.

21. The tube of claim 17, wherein the thickness of the peripheral tube wall is at least 2.5 mm.

22. The tube of claim 9 or 19, wherein the paper-paper adhesive material is polyvinyl acetate (PVA).

* * * * *